(12) United States Patent
Shin et al.

(10) Patent No.: US 10,131,836 B2
(45) Date of Patent: Nov. 20, 2018

(54) COLOR CONVERSION FILM AND BACK LIGHT UNIT AND DISPLAY APPARATUS COMPRISING THE SAME

(71) Applicant: LG CHEM, LTD., Seoul (KR)

(72) Inventors: Dong Mok Shin, Daejeon (KR); Byeong In Ahn, Daejeon (KR); Nari Kim, Daejeon (KR); Hoyong Lee, Daejeon (KR); Ji Ho Kim, Daejeon (KR); Joo Yeon Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 377 days.

(21) Appl. No.: 15/010,482

(22) Filed: Jan. 29, 2016

(65) Prior Publication Data

US 2016/0223162 A1 Aug. 4, 2016

(30) Foreign Application Priority Data

Jan. 31, 2015 (KR) .................... 10-2015-0015708

(51) Int. Cl.
*C09K 11/06* (2006.01)
*G02F 1/1335* (2006.01)

(52) U.S. Cl.
CPC ............ *C09K 11/06* (2013.01); *G02F 1/1335* (2013.01); *G02F 1/133514* (2013.01)

(58) Field of Classification Search
CPC ............... C09K 11/06; G02F 1/133514; G02F 1/133617
See application file for complete search history.

(56) References Cited

U.S. PATENT DOCUMENTS

| | | | |
|---|---|---|---|
| 8,820,923 B2 * | 9/2014 | Harding | C08K 5/29 351/159.01 |
| 8,931,930 B2 * | 1/2015 | Harding | G02C 7/104 362/326 |
| 2010/0164365 A1 | 7/2010 | Yoshino et al. | |

FOREIGN PATENT DOCUMENTS

JP 2011-241160 A 12/2011

* cited by examiner

*Primary Examiner* — C Melissa Koslow
(74) *Attorney, Agent, or Firm* — Dentons US LLP

(57) ABSTRACT

The invention described in the present specification relates to a color conversion film including a resin matrix; and an organic fluorescent substance, wherein the organic fluorescent substance includes a first fluorescent substance and a second fluorescent substance, and the first fluorescent substance has a light emission peak with FWHM of 60 nm or less and a Stokes shift of 30 nm or less when irradiating light having a light emission peak at 450 nm, a FWHM of 40 nm or less and monomodal light emission intensity distribution, a method for preparing the same, and a back light unit including the color conversion film.

7 Claims, 6 Drawing Sheets

COLOR CONVERSION FILM AND BACK LIGHT UNIT AND DISPLAY APPARATUS COMPRISING THE SAME

TECHNICAL FIELD

The present application relates to a color conversion film, and a back light unit and a display apparatus including the same.

This application claims priority to and the benefits of Korean Patent Application No. 10-2015-0015708, filed with the Korean Intellectual Property Office on Jan. 31, 2015, the entire contents of which are incorporated herein by reference.

BACKGROUND ART

As large screen televisions become more common, televisions are also becoming high-definition, slimmer and highly functional. High performance and high definition OLED TVs still have problems of price competitiveness, and real markets for OLED TVs have not yet begun. Accordingly, efforts to similarly secure advantages of OLEDs with LCDs have been continuously made.

As one of the efforts, many quantum dot-related technologies and prototypes have been recently incorporated. However, cadmium-based quantum dots have safety problems such as restrictions on the use, and therefore, interests in manufacturing back lights using quantum dots without cadmium, which has relatively no safety issues, have been rising.

DISCLOSURE

Technical Problem

The present application provides a color conversion film having excellent color gamut and luminance property, a method for manufacturing the same, and a back light unit and a display apparatus including the color conversion film.

Technical Solution

One embodiment of the present application provides a color conversion film including a resin matrix; and an organic fluorescent substance dispersed in the resin matrix, wherein the organic fluorescent substance includes a first fluorescent substance and a second fluorescent substance, and the first fluorescent substance has a light emission peak with FWHM (full width at half maximum) of 60 nm or less and a Stokes shift of 30 nm or less when irradiating light having a light emission peak at 450 nm, a FWHM of 40 nm or less and monomodal light emission intensity distribution.

According to another embodiment of the present application, in the embodiment described above, the first fluorescent substance has a maximum light emission wavelength in a 515 nm to 555 nm range when irradiating light having a light emission peak at 450 nm, a FWHM of 40 nm or less and monomodal light emission intensity distribution, and the second fluorescent substance has a maximum light emission wavelength in a 490 nm to 540 nm range when irradiating light having a light emission peak at 450 nm, a FWHM of 40 nm or less and monomodal light emission intensity distribution.

According to another embodiment of the present application, in the embodiments described above, the color conversion film has a maximum light emission wavelength in a 490 nm to 555 nm range when irradiating light having a light emission peak at 450 nm, a FWHM of 40 nm or less and monomodal light emission intensity distribution.

According to another embodiment of the present application, in the embodiments described above, the color conversion film has a maximum light emission wavelength in a 515 nm to 555 nm range when irradiating light having a light emission peak at 450 nm, a FWHM of 40 nm or less and monomodal light emission intensity distribution.

According to another embodiment of the present application, in the embodiments described above, the first fluorescent substance receives at least some of excited electrons of the second fluorescent substance, or at least some of absorption wavelengths of the first fluorescent substance are overlapped with at least some of light emission wavelengths of the second fluorescent substance.

According to another embodiment of the present application, in the embodiments described above, the first fluorescent substance and the second fluorescent substance have a different FWHM at light emission peak in a film state when irradiating light having a light emission peak at 450 nm, a FWHM of 40 nm or less and monomodal light emission intensity distribution.

According to another embodiment of the present application, in the embodiments described above, the light emission peak with FWHM of the first fluorescent substance in a film state is narrower than the light emission peak with FWHM of the second fluorescent substance in a film state when irradiating light having a light emission peak at 450 nm, a FWHM of 40 nm or less and monomodal light emission intensity distribution.

According to another embodiment of the present application, in the embodiments described above, the light emission wavelength of the second fluorescent substance in a film state includes a maximum absorption wavelength of the first fluorescent substance in a film state when irradiating light having a light emission peak at 450 nm, a FWHM of 40 nm or less and monomodal light emission intensity distribution. Particularly, the maximum absorption wavelength of the first fluorescent substance and the maximum light emission wavelength of the second fluorescent substance are preferably present within 30 nm.

Another embodiment of the present application provides a method for preparing the color conversion film according to the embodiments described above, the method including coating a resin solution in which an organic fluorescent substance including a first fluorescent substance and a second fluorescent substance that are different from each other is dissolved on a substrate; and drying the resin solution coated on the substrate.

Another embodiment of the present application provides a method for preparing the color conversion film according to the embodiments described above, the method including extruding an organic fluorescent substance including a first fluorescent substance and a second fluorescent substance that are different from each other together with a resin.

Another embodiment of the present application provides a back light unit including the color conversion film.

Advantageous Effects

According to a color conversion film of embodiments described in the present specification, light emission efficiency of a first fluorescent substance can be enhanced by the first fluorescent substance receiving at least some of excited electrons of a second fluorescent substance, or absorbing light the second fluorescent substance emits.

Consequently, when the first fluorescent substance is a fluorescent substance capable of increasing color gamut, color gamut enhancement can be maximized with a relatively small amount of the first fluorescent substance while a color gamut decrease caused by the second fluorescent substance hardly occurs. In addition, even when the first fluorescent substance is not able to sufficiently absorb blue light emitting from a light source due to a narrow light absorption wavelength of the first fluorescent substance, light emission efficiency of the first fluorescent substance can be maximized through the second fluorescent substance.

MODE FOR DISCLOSURE

Figure 1:
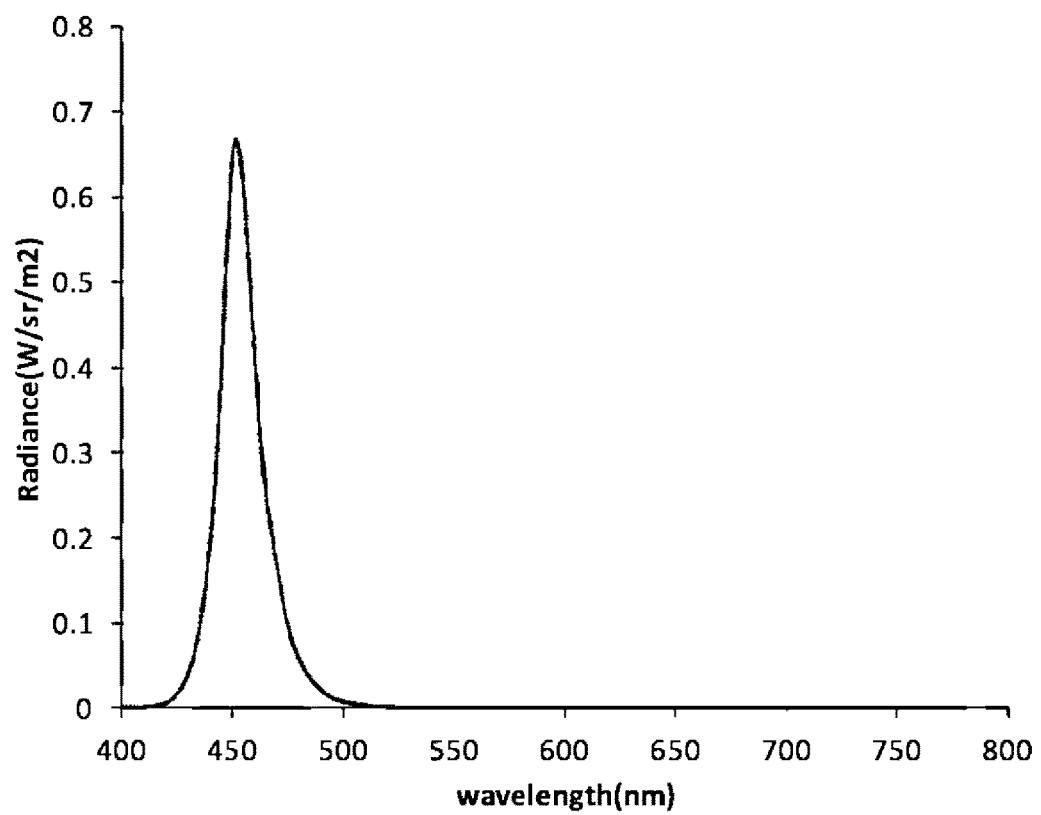
FIG. 1 shows a light emission wavelength of an inorganic LED.

One embodiment of the present application provides a color conversion film including a resin matrix; and an organic fluorescent substance dispersed in the resin matrix, wherein the organic fluorescent substance includes a first fluorescent substance and a second fluorescent substance, and the first fluorescent substance has a light emission peak with FWHM of 60 nm or less and a Stokes shift of 30 nm or less when irradiating light having a light emission peak at 450 nm, a FWHM of 40 nm or less and monomodal light emission intensity distribution. Herein, the Stokes shift means a difference between a maximum absorption wavelength and a maximum light emission wavelength of a fluorescent substance. In order to measure the Stokes shift, the maximum absorption wavelength may be obtained by measuring an absorbed amount for each wavelength using a UV-VIS spectrometer, and the maximum light emission wavelength may be obtained by measuring light emission intensity for each wavelength when irradiating light of a specific wavelength using a Photo Luminescence Spectrometer. In the embodiment, the first fluorescent substance has a narrow FWHM of 60 nm or less, which helps in enhancing the color gamut, and by using an additional second fluorescent substance, the second fluorescent substance is capable of performing a role of transferring energy to the first fluorescent substance by absorbing blue light having a light emission peak at 450 nm even when the first fluorescent substance has a small Stokes shift of 30 nm or less. It is more favorable that the first fluorescent substance has a narrower light emission peak FWHM.

According to another embodiment of the present application, in the embodiment described above, the first fluorescent substance has a maximum light emission wavelength in a 515 nm to 555 nm range when irradiating light having a light emission peak at 450 nm, a FWHM of 40 nm or less and monomodal light emission intensity distribution, and the second fluorescent substance has a maximum light emission wavelength in a 490 nm to 540 nm range when irradiating light having a light emission peak at 450 nm, a FWHM of 40 nm or less and monomodal light emission intensity distribution.

The first fluorescent substance has a maximum light emission wavelength in a 515 nm to 555 nm range when irradiating light having a light emission peak of a 450 nm wavelength, and the second fluorescent substance has a maximum light emission wavelength in a 490 nm to 540 nm range when irradiating light having a light emission peak of a 450 nm wavelength. According to this embodiment, the first fluorescent substance may absorb excited electrons in the second fluorescent substance or light emitting from the second fluorescent substance when irradiating light. In this case, intensity of the light emission peak of the first fluorescent substance may be enhanced. Herein, a difference between the position of the maximum absorption wavelength of the first fluorescent substance and the position of the maximum light emission wavelength of the second fluorescent substance is 30 nm or less and preferably 20 nm or less. From this, the first fluorescent substance layer more readily absorbs light emitting from the second fluorescent substance.

According to another embodiment of the present application, in the embodiments described above, the color conversion film has a maximum light emission wavelength in a 490 nm to 555 nm and preferably in a 515 nm to 555 nm range when irradiating light having a light emission peak at 450 nm, a FWHM of 40 nm or less and monomodal light emission intensity distribution.

According to another embodiment of the present application, in the embodiments described above, the first fluorescent substance and the second fluorescent substance have a different FWHM at light emission peak in a film state when irradiating light having a light emission peak at 450 nm, a FWHM of 40 nm or less and monomodal light emission intensity distribution. According to this embodiment, the first fluorescent substance may absorb excited electrons in the second fluorescent substance or light emitting from the second fluorescent substance when irradiating light. When using an organic fluorescent substance having a light emission spectrum with narrow FWHM in a film state as the first fluorescent substance, and using an organic fluorescent substance having a light emission spectrum with relatively wide FWHM in a film state as the second fluorescent substance, color gamut may be enhanced by the first fluorescent substance without a color gamut decrease caused by the second fluorescent substance, and light emission intensity (efficiency) may be greatly enhanced as well.

According to another embodiment of the present application, in the embodiments described above, the first fluorescent substance receives at least some of excited electrons of the second fluorescent substance, or at least some of absorption wavelengths of the first fluorescent substance are overlapped with at least some of light emission wavelengths of the second fluorescent substance. When using one type of an organic fluorescent substance, there is a limit in the light emission intensity increase with an added amount even when increasing the amount of the organic fluorescent substance added, and there are problems such as a quantum efficiency decrease caused by the organic fluorescent substances forming dimers or excimers with each other, and a red shift of a light emission wavelength. However, when using a first fluorescent substance and a second fluorescent substance according to the embodiment described above, problems such as above may be prevented, and light emission intensity may increase even when using a small amount of the first fluorescent substance, and quantum efficiency does not decrease.

According to one example, the first fluorescent substance may receive at least some of excited electrons of the second fluorescent substance. Specifically, when electrons in an excited state are generated by the second fluorescent substance absorbing blue light, the second fluorescent substance delivers at least some of the electrons in an excited state to the first fluorescent substance. In this case, the first fluorescent substance may emit light using the received electrons in an excited state. This is also referred to as a FRET phenomenon.

According to another example, at least some of absorption wavelengths of the first fluorescent substance are overlapped with at least some of light emission wavelengths of the second fluorescent substance. Herein, the first fluorescent substance may absorb light the second fluorescent substance emits. Consequently, the first fluorescent substance absorbs light the second fluorescent substance emits in addition to blue light emitting from a light source, and therefore, light emission efficiency may be enhanced with a relatively small amount of the first fluorescent substance.

According to another embodiment of the present application, in the embodiments described above, the FWHM at light emission wavelength of the first fluorescent substance in a film state is narrower than the FWHM at light emission wavelength of the second fluorescent substance in a film state when irradiating light having a light emission peak at 450 nm, a FWHM of 40 nm or less and monomodal light emission intensity distribution. The first fluorescent substance having a small FWHM at light emission wavelength may provide enhanced color gamut. When the second fluorescent substance has a relatively wide FWHM, light emission of a part that may decrease color gamut is either reduced or disappears, and therefore, a color gamut decrease caused by the second fluorescent substance hardly occurs.

In the present specification, the FWHM at light emission peak means a width of a light emission peak at a half of the maximum height in a maximum light emission peak of the light emitting from a film when irradiating light having a light emission peak at 450 nm, a FWHM of 40 nm or less and monomodal light emission intensity distribution. In the present specification, the FWHM at light emission peak is measured in a film state. In the case of a color conversion film, a FWHM may be measured by irradiating light on the film. A light emission peak with FWHM of an organic fluorescent substance in a film state means measuring a FWHM by irradiating light on, instead of a solution state, a state prepared to a film form with the organic fluorescent substance alone or by mixing the organic fluorescent substance with other components that do not affect FWHM measurement.

According to another embodiment of the present application, in the embodiments described above, the light emission wavelength of the second fluorescent substance in a film state includes a maximum absorption wavelength of the first fluorescent substance in a film state when irradiating light having a light emission peak at 450 nm, a FWHM of 40 nm or less and monomodal light emission intensity distribution. In this case, the first fluorescent substance may efficiently absorb emitted light of the first fluorescent substance. Particularly, the maximum absorption wavelength of the first fluorescent substance and the maximum light emission wavelength of the second fluorescent substance are preferably present within 30 nm.

According to another embodiment of the present application, the maximum light emission wavelength of the first fluorescent substance is present in 515 nm to 555 nm.

According to another embodiment of the present application, the maximum absorption wavelength of the first fluorescent substance is present in 450 nm to 515 nm. According to one example, the maximum absorption wavelength of the first fluorescent substance may be present in 490 nm to 510 nm, and specifically around 500 nm.

According to another embodiment of the present application, the light emission wavelength of the second fluorescent substance includes at least some from 450 nm to 515 nm.

According to another embodiment of the present application, the maximum light emission wavelength of the second fluorescent substance is present in 490 nm to 540 nm, for example, in 500 nm to 530 nm. For example, in order to maximally convert light near 500 nm to light emission by the first fluorescent substance, light emission of the second fluorescent substance is preferably maximum near 500 nm.

An inorganic LED used as a light source of a back light unit as in FIG. 1 generally has a sharp light emission peak having a maximum light emission peak with FWHM of approximately 20 nm at 450 nm. The second fluorescent substance increases light emission around 500 nm, an absorption wavelength range of the first fluorescent substance described above, which allows sufficient green light emission by the first fluorescent substance even with concentrations that do not form excimers.

According to one embodiment of the present application, content of the first fluorescent substance may be 0.01 parts by weight to 2 parts by weight with respect to 100 parts by weight of the resin matrix. For enhancing color gamut by the first fluorescent substance, the first fluorescent substance needs to be controlled to have relatively higher content than the second fluorescent substance.

According to another embodiment of the present application, content of the second fluorescent substance may be 0.01 parts by weight to 2 parts by weight with respect to 100 parts by weight of the resin matrix. When the content of the second fluorescent substance is too high, there is a limit in the light emission efficiency increase, and color coordinates may be difficult to be obtained since blue light is more consumed instead of light emission intensity decreasing or not increasing, and dimers or excimers form between fluorescent substances causing a problem of a red shift of a light emission wavelength, and as a result, precisely obtaining a target wavelength may be difficult.

As the first fluorescent substance, an organic fluorescent substance including a pyrromethene metal complex structure may be used.

According to one example, an organic fluorescent substance of the following Chemical Formula 1 may be used as the first fluorescent substance.

[Chemical Formula 1]

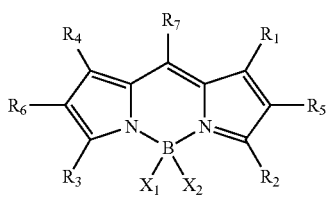

In Chemical Formula 1, $X_1$ and $X_2$ are a fluorine group or an alkoxy group, $R_1$ to $R_4$ are the same as or different from each other, and each independently hydrogen, a halogen group, an alkyl group, an alkoxy group, a carboxyl group-substituted alkyl group, an aryl group unsubstituted or substituted with an alkoxy group, —COOR or a —COOR-substituted alkyl group, and herein, R is an alkyl group, $R_5$ and $R_6$ are the same as or different from each other, and each independently hydrogen, a cyano group, a nitro group, an alkyl group, a carboxyl group-substituted alkyl group, —SO$_3$Na, or an aryl group unsubstituted or substituted with arylalkynyl, $R_1$ and $R_5$ are linked to each other to form a substituted or unsubstituted hydrocarbon ring or a substituted or unsubstituted heteroring, and $R_4$ and $R_6$ are linked to each other to form a substituted or unsubstituted hydrocarbon ring or a substituted or unsubstituted heteroring, and $R_7$ is hydrogen; an alkyl group; a haloalkyl group; or an aryl group unsubstituted or substituted with a halogen group, an alkyl group, an alkoxy group, an aryl group or an alkylaryl group.

According to one embodiment, $R_1$ to $R_4$ of Chemical Formula 1 are the same as or different from each other, and each independently hydrogen, a fluorine group, a chlorine group, an alkyl group having 1 to 6 carbon atoms, an alkoxy group having 1 to 6 carbon atoms, a carboxylic acid-substituted alkyl group having 1 to 6 carbon atoms, an aryl group having 6 to 20 carbon atoms unsubstituted or substituted with an alkoxy group having 1 to 6 carbon atoms, —COOR, or a —COOR-substituted alkyl group having 1 to 6 carbon atoms, and herein, R is an alkyl group having 1 to 6 carbon atoms.

According to another embodiment, $R_1$ to $R_4$ of Chemical Formula 1 are the same as or different from each other, and each independently hydrogen, a chlorine group, a methyl group, a carboxyl group-substituted ethyl group, a methoxy group, a phenyl group, a methoxy group-substituted phenyl group or a —COOR-substituted methyl group, and herein, R is an alkyl group having 1 to 6 carbon atoms.

According to one embodiment, $R_5$ and $R_6$ of Chemical Formula 1 are the same as or different from each other, and each independently hydrogen, a nitro group, an alkyl group having 1 to 6 carbon atoms, a carboxyl group-substituted alkyl group having 1 to 6 carbon atoms, or —SO$_3$Na.

According to one embodiment, $R_5$ and $R_6$ of Chemical Formula 1 are the same as or different from each other, and each independently hydrogen, a nitro group, an ethyl group, a carboxyl group-substituted ethyl group, or —SO$_3$Na.

According to one embodiment, $R_7$ of Chemical Formula 1 is hydrogen; an alkyl group having 1 to 6 carbon atoms; or an aryl group having 6 to 20 carbon atoms unsubstituted or substituted with an alkyl group having 1 to 6 carbon atoms, an alkoxy group having 1 to 6 carbon atoms, an aryl group having 6 to 20 carbon atoms or an alkylaryl group having 7 to 20 carbon atoms.

According to one embodiment, $R_7$ of Chemical Formula 1 is hydrogen, methyl, ethyl, propyl, butyl, pentyl, phenyl, methylphenyl, dimethylphenyl, trimethylphenyl, naphthyl, biphenyl-substituted naphthyl, dimethylfluorene-substituted naphthyl, terphenyl-substituted dimethylphenyl, methoxyphenyl or dimethoxyphenyl. According to one embodiment, Chemical Formula 1 may be represented by the following structural formulae.

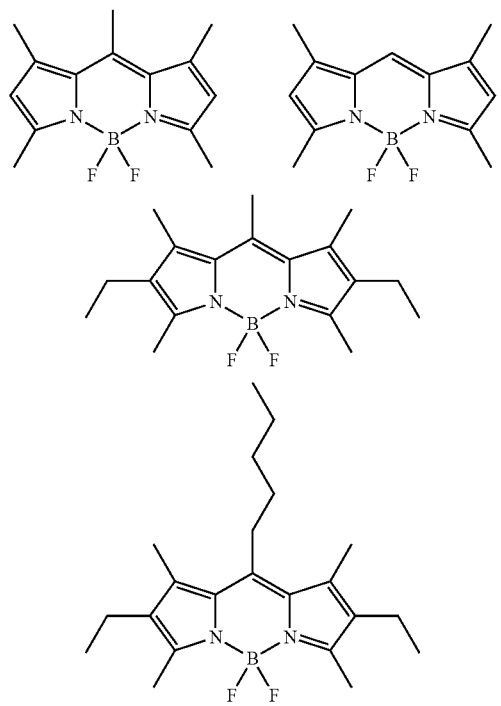

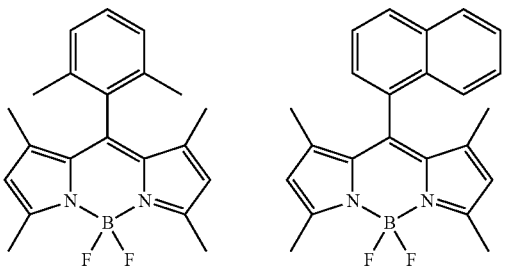

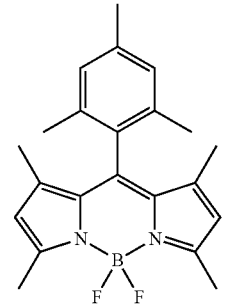

-continued
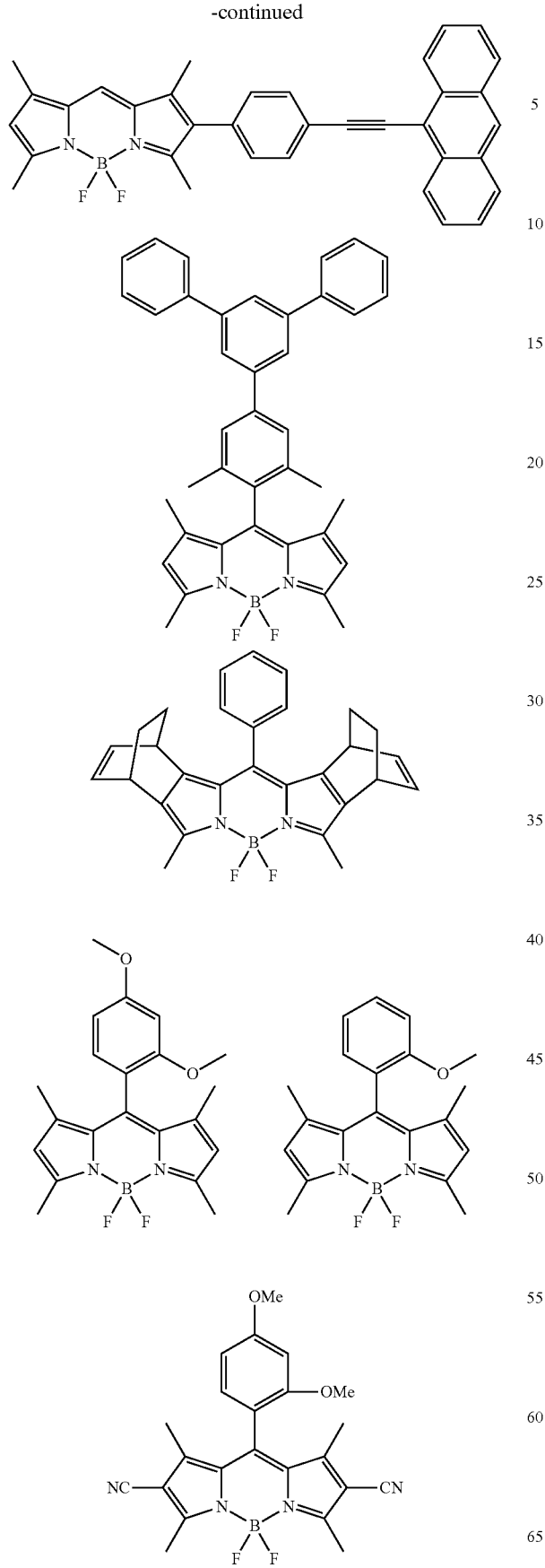
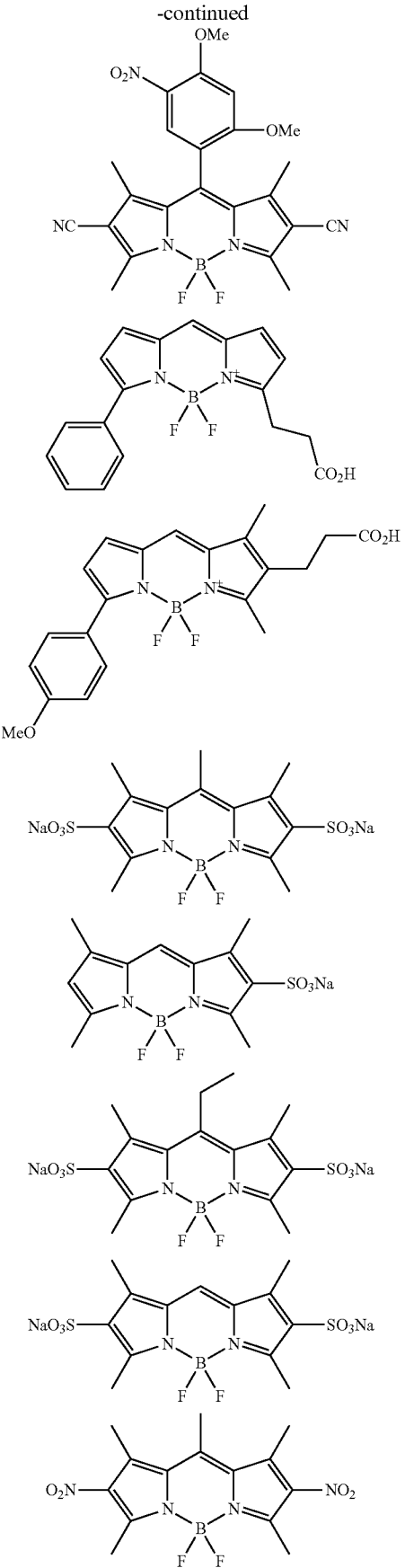

-continued

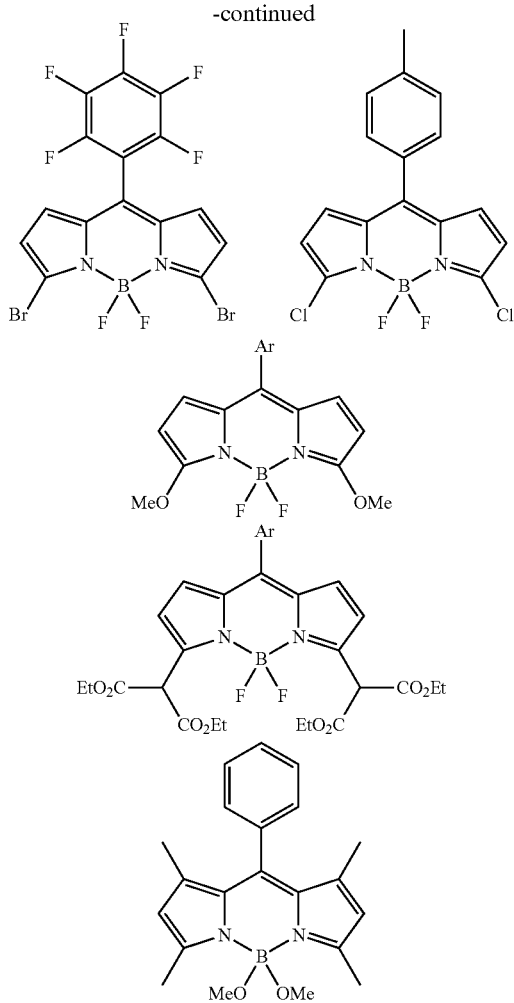

In the structural formulae, Ar is a substituted or unsubstituted aryl group. For example, Ar may be an aryl group substituted with an alkyl group or an alkoxy group.

For example, a compound having the following structural formula may be used. The compound having the following structural formula has a maximum absorption wavelength at 490 nm and a maximum light emission peak at 520 nm in a solution state.

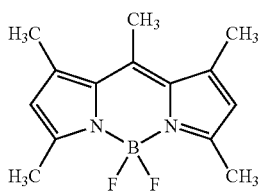

Figure 2:
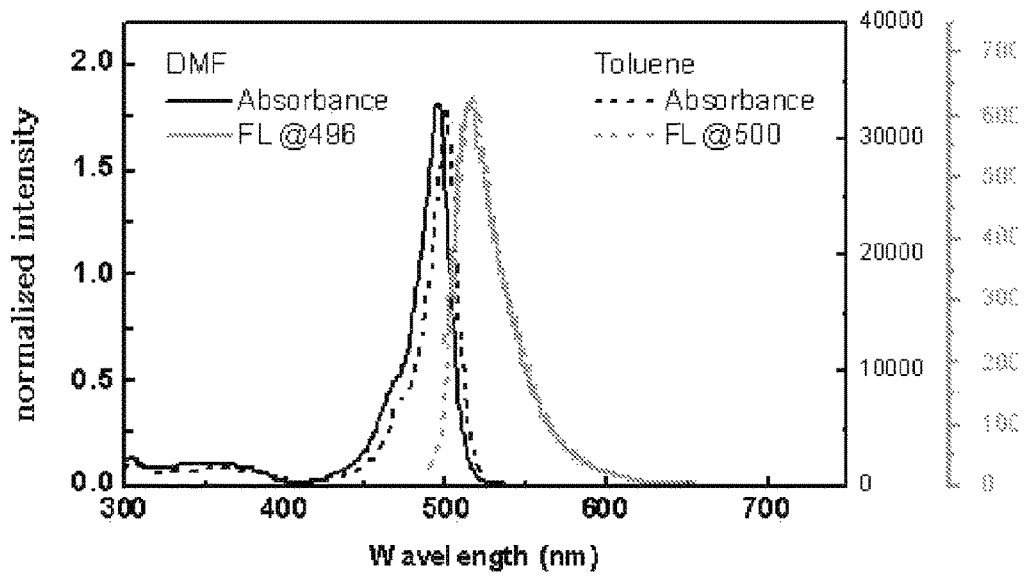
FIG. 2 shows absorption wavelength and light emission wavelength spectra of a compound having a BODIPY structure in various solvents.

An absorption wavelength and a light emission wavelength of a compound having the above structural formula are shown in FIG. 2. The compound having the above structural formula has a narrow Stokes shift by solvents, has a maximum light emission wavelength in 515 nm to 540 nm, and has a maximum absorption wavelength near 500 nm. In addition, the compound having the above structural formula has a narrow light emission peak FWHM, which is advantageous for color gamut enhancement, and also has a narrow absorption wavelength FWHM, which leads to absorption in a relatively narrow wavelength region. Accordingly, by using a second fluorescent substance having a light emission wavelength overlapped with an absorption wavelength of the compound having the above structural formula, light absorption by the compound having the above structural formula may increase, and accordingly, sufficient blue light emission is obtained.

However, the first fluorescent substance is not limited to the above-mentioned structural formulae, and various fluorescent substances may be used.

As the second fluorescent substance, an organic fluorescent substance including a pyrromethene metal complex structure, an anthracene structure or a pyrene structure may be used.

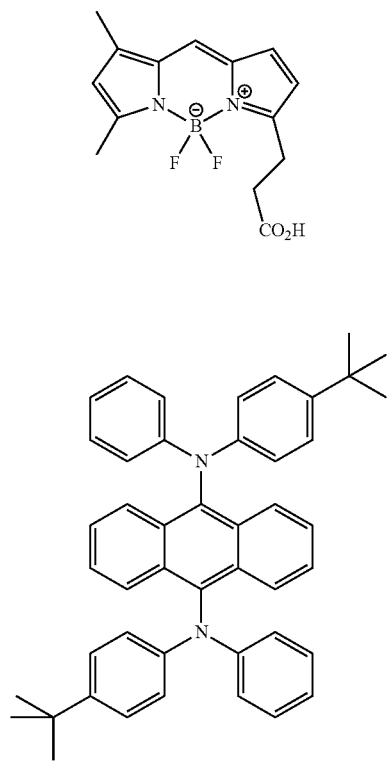

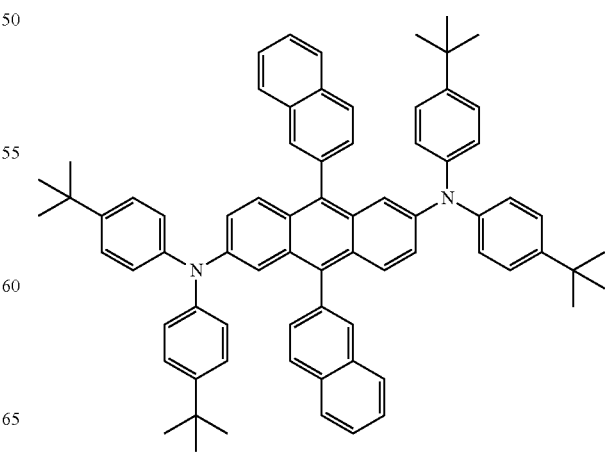

-continued

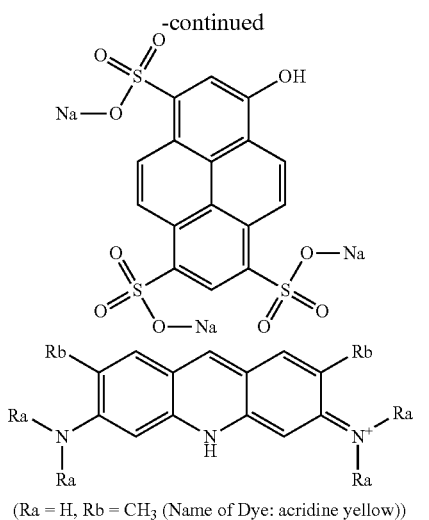

(Ra = H, Rb = CH₃ (Name of Dye: acridine yellow))

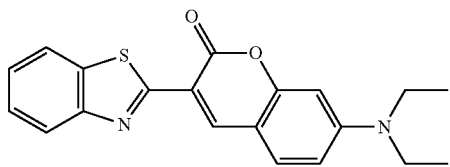

Cou-6

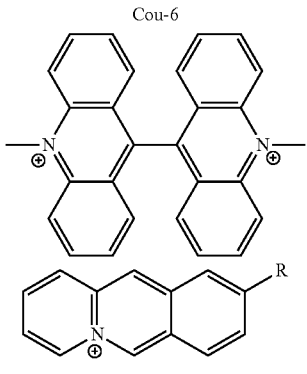

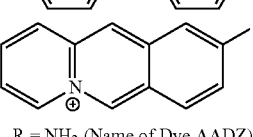

R = NH₂ (Name of Dye AADZ)

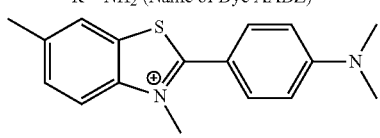

(Thioflavin T)

Fluorescent substances having the above structural formulae emit much from 500 nm, and a maximum light emission wavelength is in a 490 nm to 540 nm range, and therefore, such light emission may be absorbed by the first fluorescent substance enabling the first fluorescent substance being excited and emitting light. However, the second fluorescent substance is not limited to the above-mentioned structural formulae, and various fluorescent substances may be used.

According to one embodiment of the present application, the organic fluorescent substance may further include an organic fluorescent substance absorbing blue light and emitting red light, or an organic fluorescent substance having a maximum light emission wavelength in a 620 nm to 680 nm range when irradiating light having a light emission peak at 450 nm, a FWHM of 40 nm or less and monomodal light emission intensity distribution.

In the present specification, blue light, green light and red light may use definitions known in the art, and for example, blue light is light having a wavelength selected from wavelengths of 400 nm to 500 nm, green light is light having a wavelength selected from wavelengths of 500 nm to 560 nm, and red light is light having a wavelength selected from wavelengths of 600 nm to 780 nm. In the present specification, a green fluorescent substance absorbs at least some of blue light and emits green light, and a red fluorescent substance absorbs at least some of blue light or green light and emits red light. For example, a red fluorescent substance may absorb light having a wavelength of 500 nm to 600 nm as well as blue light.

The resin matrix material is preferably a thermoplastic polymer or a thermocurable polymer. Specifically, a poly(meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

The color conversion film according to the embodiments described above may have a thickness of 2 micrometers to 200 micrometers. Particularly, the color conversion film may exhibit high luminance even with a small thickness of 2 micrometers to 20 micrometers. This is due to the fact that the content of the fluorescent substance molecules included in the unit volume is higher compared to quantum dots. For example, a 5 micrometer-thick color conversion film using the organic fluorescent substance content in 0.5 wt % is capable of exhibiting high luminance of 4000 nit or higher based on the luminance of 600 nit of a blue back light unit (blue BLU).

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, transparency means having visible light transmittance of 70% or higher. For example, a PET film may be used as the substrate.

The color conversion film described above may be prepared by coating a resin solution in which the organic fluorescent substance described above is dissolved on a substrate and drying the result, or by extruding and filming the organic fluorescent substance described above together with a resin.

The organic fluorescent substance described above is dissolved in the resin solution, and therefore, the organic fluorescent substance is uniformly distributed in the solution. This is different from a quantum dot film preparation process that requires a separate dispersion process.

Additives may be added to the resin solution as necessary, and for example, light diffusing agent such as silica, titania, zirconia and alumina powder may be added.

As for the resin solution in which the organic fluorescent substance is dissolved, the preparation method is not particularly limited as long as the organic fluorescent substance and the resin described above are dissolved in the solution.

According to one example, the resin solution in which the organic fluorescent substance is dissolved may be prepared using a method of preparing a first solution by dissolving an organic fluorescent substance in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving an organic fluorescent substance and a resin, a method of dissolving an organic fluorescent substance in a solvent and subsequently adding and dissolving a resin, a method of dissolving a resin in a solvent and then subsequently adding and dissolving an organic fluorescent substance, and the like, may be used.

The organic fluorescent substance included in the solution is the same as described above.

As the resin included in the solution, the resin matrix material described above, a monomer curable with this resin matrix resin, or a combination thereof, may be used. For example, the monomer curable with the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterword while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, dimethylformamide (DMF), dimethylacetamide (DMAc), dimethyl sulfoxide (DMSO), N-methyl-pyrrolidone (NMP), cyclohexanone, propylene glycol methylethyl acetate (PGMEA), dioxane and the like, and one type or a mixture of two or more types may be used. When the first solution and the second solution are used, solvents included in each of the solutions may be the same as or different from each other. Even when different types of solvents are used in the first solution and the second solution, these solvents preferably has compatibility so as to be mixed with each other.

The process of coating the resin solution in which the organic fluorescent substance is dissolved on a substrate may use a roll-to-roll process. For example, a process of unwinding a substrate from a substrate-wound roll, coating the resin solution in which the organic fluorescent substance is dissolved on one surface of the substrate, drying the result, and then winding the result again on the roll may be used. When a roll-to-roll process is used, viscosity of the resin solution is preferably determined in a range capable of carrying out the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is carried out. The drying process may be carried out under a condition required to remove a solvent. For example, a color conversion film including a fluorescent substance having target thickness and concentration may be obtained on a substrate by carrying out the drying in an oven located close to a coater under a condition to sufficiently evaporate a solvent, in a direction of the substrate progressing during the coating process.

When a monomer curable with the resin matrix resin is used as the resin included in the solution, curing, for example, UV curing, may be carried out prior to or at the same time as the drying.

When the organic fluorescent substance is filmed by being extruded with a resin, extrusion methods known in the art may be used, and for example, a color conversion film may be prepared by extruding the organic fluorescent substance with a resin such as a polycarbonate (PC)-based, a poly(meth)acryl-based and a styrene-acrylonitrile (SAN)-based.

Figure 9:
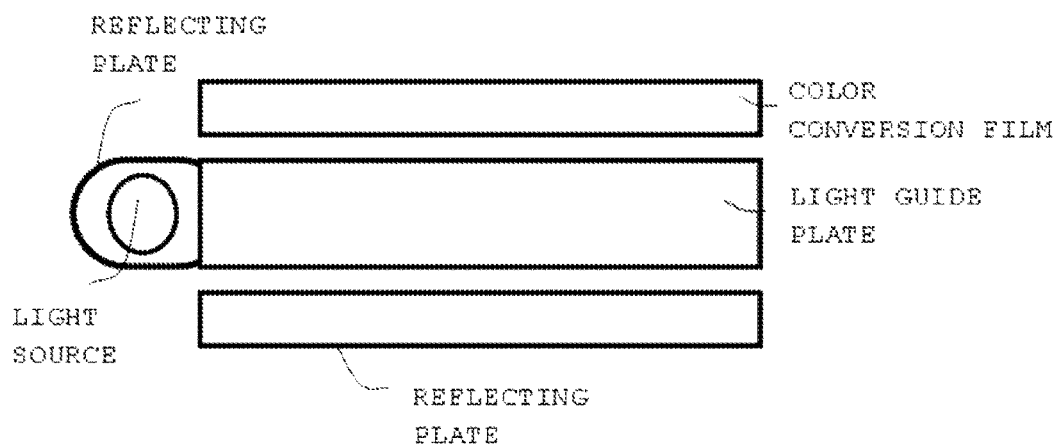
FIG. 9 is a mimetic diagram using a color conversion film according to one embodiment of the present application in a back light.

Another embodiment of the present application provides a back light unit including the color conversion film described above. The back light unit may have back light unit constitutions known in the art except for including the color conversion film. For example, FIG. 9 illustrates one example. According to FIG. 9, the color conversion film according to the embodiments described above is provided on a surface of a light guide plate opposite to a surface facing a reflecting plate. FIG. 9 illustrates a constitution including a light source and a reflecting plate surrounding the light source, however, the structure is not limited thereto, and may be modified depending on back light unit structures known in the art. In addition, the light source may use a direct type as well as a side chain type, and a reflecting plate or a reflecting layer may not be included or replaced with other constituents as necessary, and when necessary, additional films such as a light diffusion film, a light concentrating film and a brightness enhancing film may be further provided. Preferably, a light concentrating film and a brightness enhancing film are additionally provided on the color conversion film.

In the constitution of a back light unit such as in FIG. 9, a scattering pattern may be provided as necessary on an upper or lower surface of the light guide plate. Light flowed into the light guide plate has non-uniform light distribution caused by the repetition of optical processes such as reflection, total reflection, refraction and penetration, and the scattering pattern may be used for inducing the non-uniform light distribution to uniform brightness.

Figure 10:
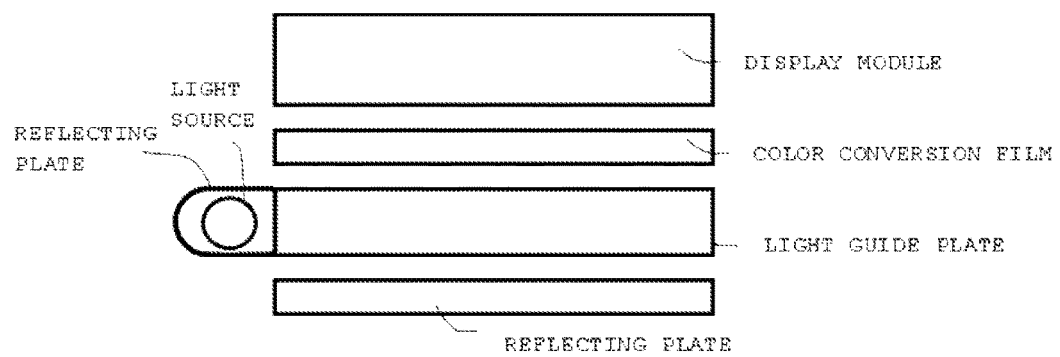
FIG. 10 is a mimetic diagram illustrating a structure of a display apparatus according to one embodiment of the present application.

According to another embodiment of the present application, a display apparatus including the back light unit described above is provided. The display apparatus is not particularly limited as long as it includes the back light unit described above as a constituent. For example, the display apparatus includes a display module and a back light unit. FIG. 10 illustrates a structure of the display apparatus. However, the structure is not limited thereto, and additional films such as a light diffusion film, a light concentrating film and a brightness enhancing film may be further provided as necessary between the display module and the back light unit.

Hereinafter, the present invention will be described in more detail with reference to examples.

Example 1

A first solution was prepared by dissolving a first fluorescent substance (BDP-G1, Stokes shift 16 nm, maximum light absorption wavelength 500 nm and maximum light emission wavelength 516 nm in toluene solution, FWHM=34 nm) and a second fluorescent substance (ANT-1, Stokes shift 49 nm, maximum light absorption wavelength 465 nm and maximum light emission wavelength 514 nm in toluene solution, FWHM=55 nm) of the following structural formulae in a xylene solvent in a weight ratio of 1:1.

(BDP-G1)

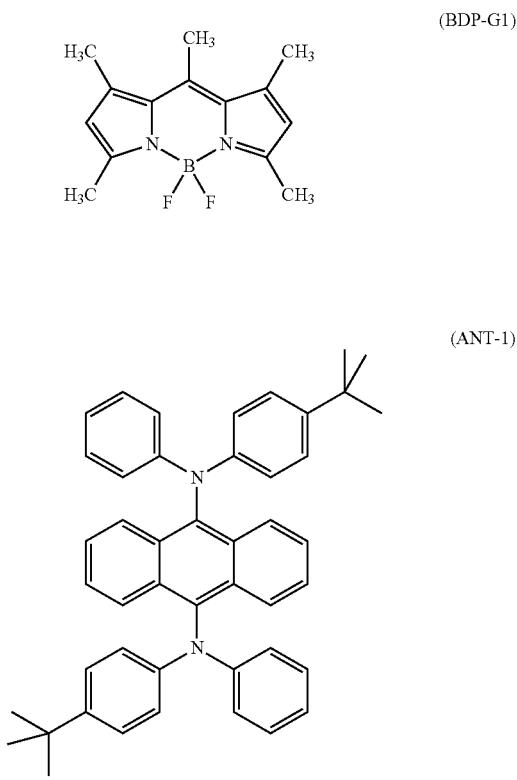

(ANT-1)

(ANT-2)

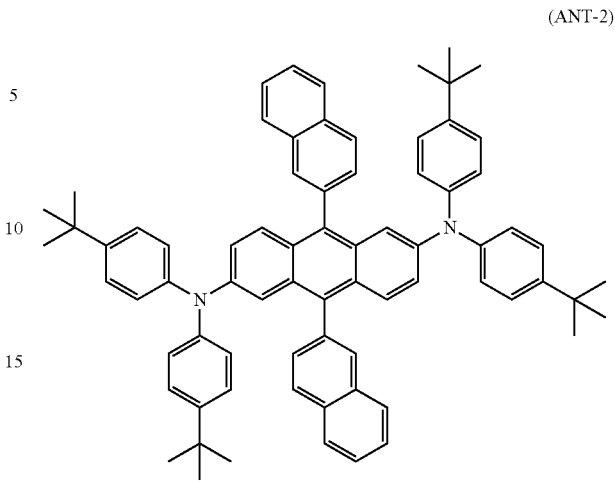

A second solution was prepared by dissolving a thermoplastic resin SAN (styrene-acrylonitrile-based) in a xylene solvent. The first solution and the second solution were mixed so that the first fluorescent substance was in 0.5 parts by weight and the second fluorescent substance in 0.5 parts by weight based on 100 parts by weight of the SAN, and uniformly mixed. Solid content in the mixed solution was 20% by weight, and viscosity was 200 cps. This solution was coated on a PET substrate, and the result was dried to prepare a color conversion film.

A luminance spectrum of the prepared color conversion film was measured using a spectroradiometer (TOPCON Corporation SR series). Specifically, the prepared color conversion film was laminated on one surface of a light guide plate of a back light unit including an LED blue back light (maximum light emission wavelength 450 nm) and the light guide plate, and after laminating a prism sheet and a DBEF film on the color conversion film, a luminance spectrum of the film was measured. When measuring the luminance spectrum, an initial value was set so that the brightness of the blue LED light was 600 nit based on without color conversion film.

Example 2

Preparation was carried out in the same manner as in Example 1 except that a fluorescent substance of the following structural formula (ANT-2, Stokes shift 52 nm, maximum light absorption wavelength 456 nm and maximum light emission wavelength 508 nm in toluene solution, FWHM=62 nm) was used as the second fluorescent substance.

Figure 3:
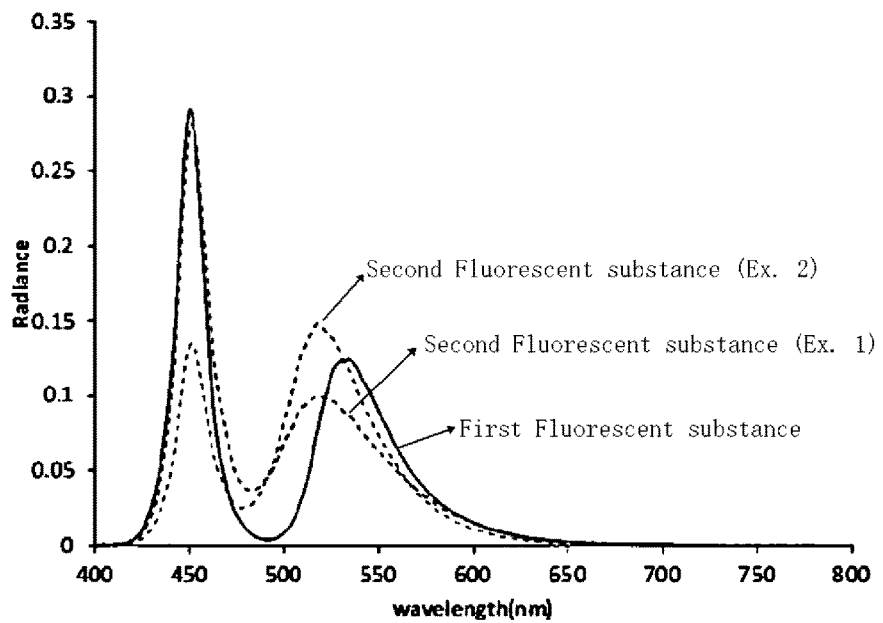
FIG. 3 shows light emission spectra of first and second fluorescent substances used in Example 1 prior to film formation.
Figure 4:
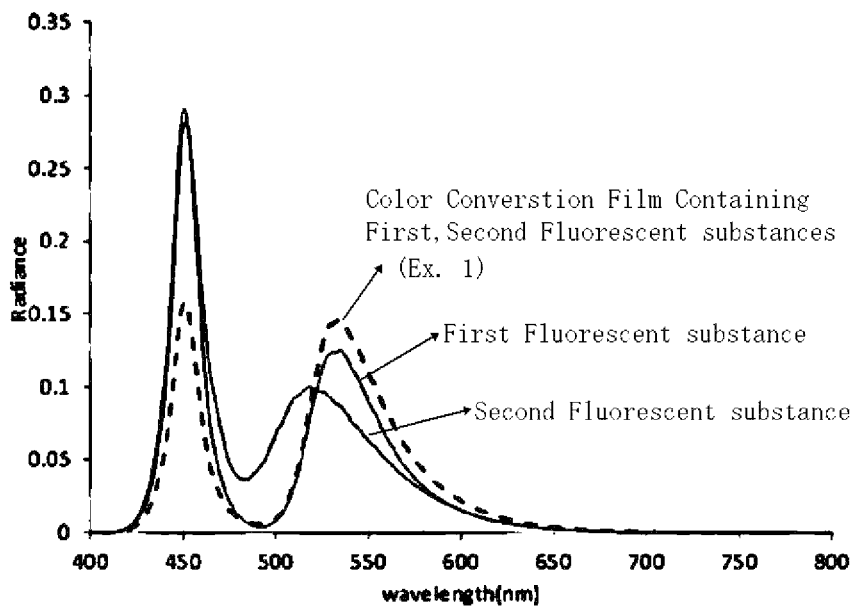
FIG. 4 and FIG. 5 each show light emission spectra of a color conversion film including first and second fluorescent substances prepared in Example 1 and Example 2, respectively.
Figure 5:
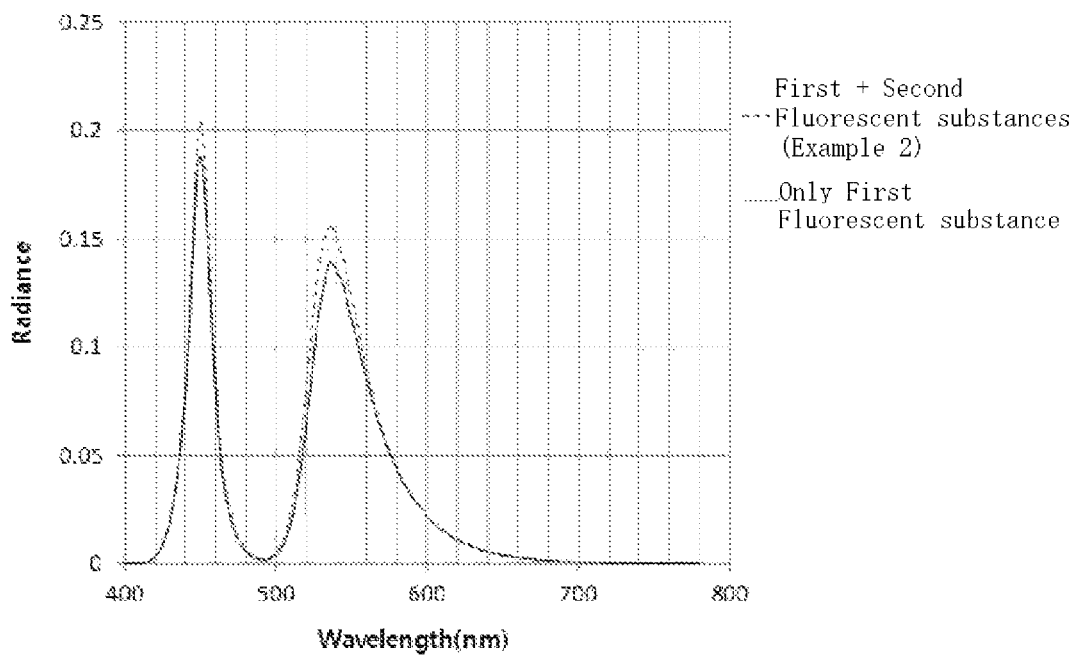

Results of measuring light emission spectra of the color conversion films prepared in Examples 1 and 2 are shown in FIG. 4 and FIG. 5. FIG. 3 shows luminance spectra of the fluorescent substances prior to film formation. According to FIG. 3, the second fluorescent substance had high light emission intensity near 500 nm. According to FIG. 4 and FIG. 5, it was identified that, by the first fluorescent substance absorbing a light emission wavelength near 480 nm to 520 nm of the second fluorescent substance, light emission intensity near 535 nm, a light emission wavelength of the first fluorescent substance, increased. Herein, the light emission wavelength of the first fluorescent substance was fixed at 535 nm, and did not change. As a reference, the graph relating to the second fluorescent substance of FIG. 4 is a result using the second fluorescent substance content in half compared to the dotted line graph relating to the second fluorescent substance of FIG. 3.

Example 3

Preparation was carried out in the same manner as in Example 1 except that a Lumogen F 083 fluorescent substance manufactured by BASF Corporation was used in 0.1 parts by weight as the second fluorescent substance, and the following structure (BDP-G2, Stokes shift 14 nm, maximum light absorption wavelength 504 nm and maximum light emission wavelength 518 nm in toluene solution, FWHM=26 nm) was used as the first fluorescent substance.

(BDP-G2)

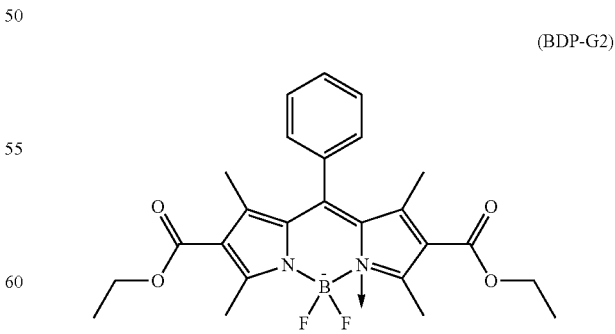

Figure 7:
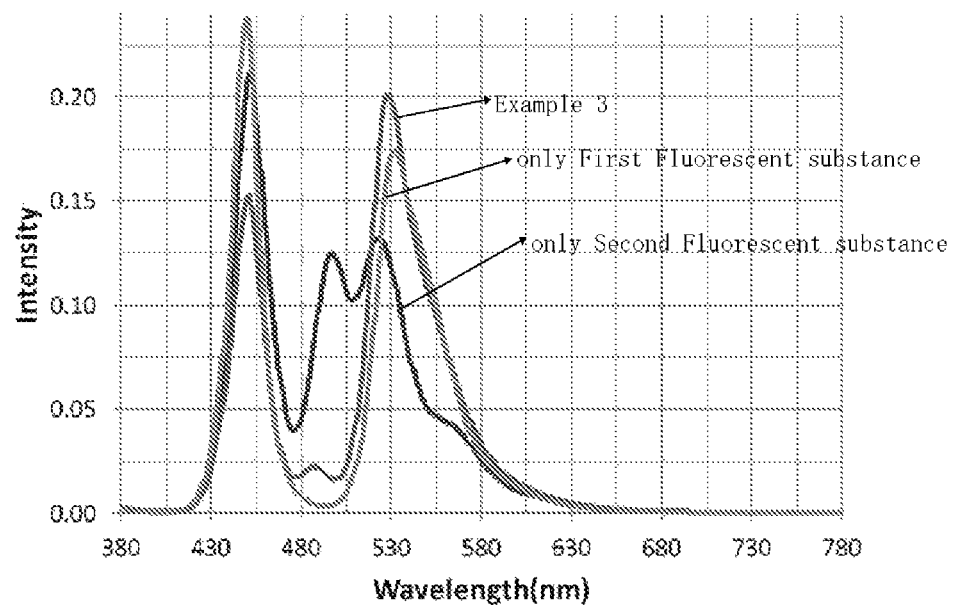
FIG. 7 shows a result of measuring light emission spectra of a color conversion film prepared in Example 3.

Results of measuring light emission spectra of the color conversion film prepared in Example 3 are shown in FIG. 7.

According to FIG. 7, it was identified that, by the first fluorescent substance absorbing a light emission wavelength near 480 nm to 510 nm among the two peaks of the second fluorescent substance, intensity of the green light increased by 15% or higher compared to the case using the first fluorescent substance alone. As identified in Comparative Examples 3 to 5, this is intensity that may not be obtained by increasing only the content of the first fluorescent substance.

Comparative Example 1

Preparation was carried out in the same manner as in Example 1 except that, as the fluorescent substance, only the first fluorescent substance was used and the second fluorescent substance was not used.

Comparative Example 2

Preparation was carried out in the same manner as in Comparative Example 1 except that the first fluorescent substance was used in an amount of 3 times.

Figure 6:
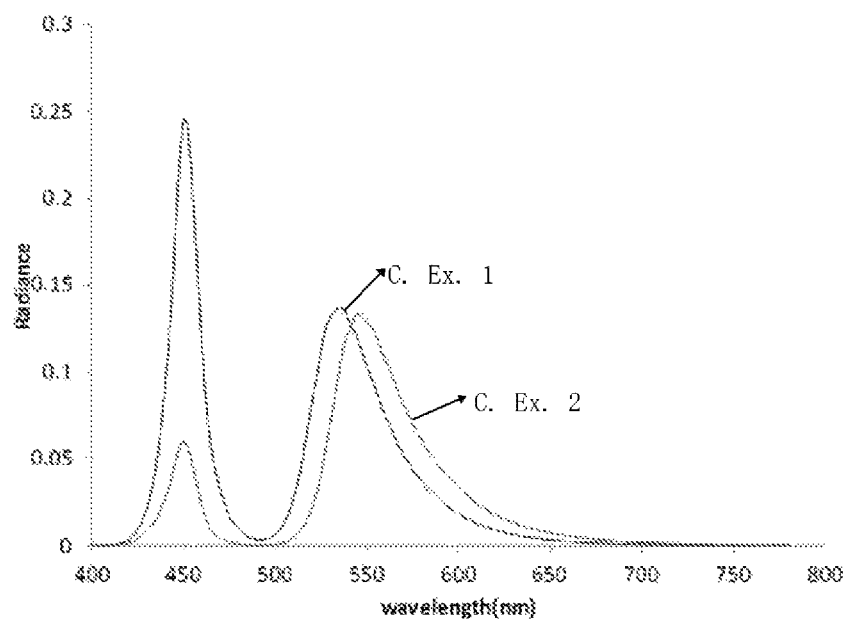
FIG. 6 shows light emission spectra of a color conversion film including only a first fluorescent substance prepared in Comparative Examples 1 and 2.

Light emission spectra of the color conversion films prepared in Comparative Examples 1 and 2 are shown in FIG. 6. It was identified that, even when the first fluorescent substance was added in excess, light emission intensity at 535 nm did not increase, and decreased instead, and only blue light absorption occurred in excess. This is considered to be caused by a quantum efficiency decrease due to excimer formation of the first fluorescent substance and the occurrence of a red shift of a wavelength.

Comparative Example 3

Preparation was carried out in the same manner as in Example 3 except that, as the fluorescent substance, only the first fluorescent substance was used and the second fluorescent substance was not used.

Comparative Example 4

Preparation was carried out in the same manner as in Comparative Example 3 except that the first fluorescent substance was used in an amount of 1.5 times.

Comparative Example 5

Figure 8:
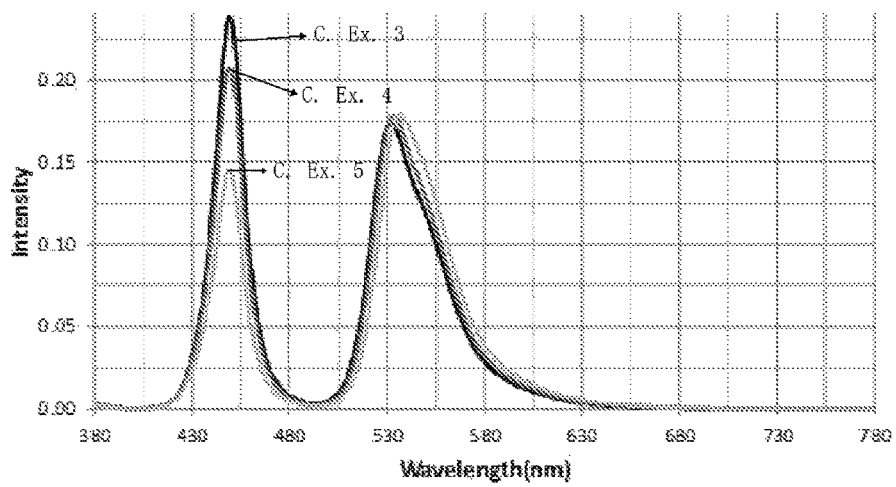
FIG. 8 shows light emission spectra of color conversion films prepared in Comparative Examples 3 to 5.

Preparation was carried out in the same manner as in Comparative Example 3 except that the first fluorescent substance was used in an amount of 2.5 times. Light emission spectra of the color conversion films prepared in Comparative Examples 3 to 5 are shown in FIG. 8. As in FIG. 6, even when the fluorescent substance content increased, intensity of the light emission wavelength did not increase, and only blue light absorption occurred in excess.

Example 4 to 6

White was obtained by using each of the green color conversion films prepared in Examples 1 to 3 with a red color conversion film (red fluorescent substance Lumogen F 305).

Comparative Example 6

White was obtained by using the green color conversion film prepared in Comparative Example 5 with a red color conversion film (red fluorescent substance Lumogen F 305).

Comparative Example 7

White was obtained by using the green color conversion film, which was prepared in the same manner as in Example 2 except that the second fluorescent substance (ANT-2) was used alone, with a red color conversion film (red fluorescent substance Lumogen F 305).

Comparative Example 8

A color conversion film was prepared in the same manner as in Comparative Example 7 except that ANT-1 was used as the first fluorescent substance and silicate inorganic fluorescent substance (PA530A prepared by Force4 Corporation, maximum light emission wavelength 530 nm, FWHM=82 nm) was used as the second fluorescent substance.

Light emission properties obtained when irradiating light having a light emission peak at 450 nm, a FWHM of 40 nm or less and monomodal light emission intensity distribution on the color conversion film obtained in Examples 4 to 6 and Comparative Examples 6 and 7 are shown in the following Table 1. As shown in the following Table 1, it was identified that color gamut was lower and luminance was also lower in the comparative examples compared to the examples.

TABLE 1

| | Green Color Conversion Film | | | Red Color Conversion Film | | | Color Gamut | |
| --- | --- | --- | --- | --- | --- | --- | --- | --- |
| | First Fluorescent Substance | Second Fluorescent Substance | Green Light Emission Peak FWHM | Red Fluorescent Substance | Red Light Emission Peak FWHM | Luminance (nit) | (sRGB versus %) u', v' Based | White Color Temperature (K) |
| Example 4 | BDP-G1 | ANT-1 | 47 | Lumogen F 305 | 81 | 206 | 119 | 8800 |
| Example 5 | BDP-G1 | ANT-2 | 47 | Lumogen F 305 | 81 | 202 | 121 | 8700 |
| Example 6 | BDP-G2 | Lumogen F 083 | 42 | Lumogen F 305 | 81 | 198 | 121 | 9000 |
| Comparative Example 6 | X | Lumogen F 083 | 61 | Lumogen F 305 | 81 | 186 | 110 | 9200 |
| Comparative Example 7 | X | ANT-2 | 62 | Lumogen F 305 | 81 | 187 | 114 | 9600 |
| Comparative Example 8 | ANT-2 | PA530A | 74 | Lumogen F 305 | 81 | 211 | 107 | 8600 |

According to Table 1, results of higher luminance and more superior color gamut in the similar color coordinate were able to be obtained in the examples compared to the comparative examples.

The invention claimed is:

1. A color conversion film comprising:
   a resin matrix; and
   an organic fluorescent substance dispersed in the resin matrix,
   wherein the organic fluorescent substance includes a first fluorescent substance and a second fluorescent substance, and the first fluorescent substance has a light emission peak with FWHM of 60 nm or less, a Stokes shift of 30 nm or less, and a maximum light emission wavelength in a 515 nm to 555 nm range when irradiated with light having a light emission peak at 450 nm, a FWHM of 40 nm or less and monomodal light emission intensity distribution,
   wherein the second fluorescent substance has a maximum light emission wavelength in a 490 nm to 540 nm range when irradiated with light having a light emission peak at 450 nm, a FWHM of 40 nm or less and monomodal light emission intensity distribution,
   wherein the first fluorescent substance receives at least some of excited electrons of the second fluorescent substance, or at least some of absorption wavelengths of the first fluorescent substance are overlapped with at least some of light emission wavelengths of the second fluorescent substance, and
   wherein the light emission peak with FWHM of the first fluorescent substance in a film state when irradiated with light is narrower than the light emission peak with FWHM of the second fluorescent substance in a film state when irradiated with light having a light emission peak at 450 nm, a FWHM of 40 nm or less and monomodal light emission intensity distribution.

2. The color conversion film of claim 1, wherein the light emission wavelength of the second fluorescent substance in a film state includes a maximum absorption wavelength of the first fluorescent substance in a film state when irradiated with light having a light emission peak at 450 nm, a FWHM of 40 nm or less and monomodal light emission intensity distribution.

3. The color conversion film of claim 1, wherein the maximum absorption wavelength of the first fluorescent substance is present in 450 nm to 515 nm.

4. The color conversion film of claim 1, wherein the light emission wavelength of the second fluorescent substance includes at least some from 450 nm to 515 nm.

5. A method for preparing the color conversion film of claim 1, the method comprising:
   coating a resin solution in which an organic fluorescent substance including a first fluorescent substance and a second fluorescent substance that are different from each other is dissolved on a substrate; and
   drying the resin solution coated on the substrate.

6. The method for preparing the color conversion film of claim 1, the method comprising extruding an organic fluorescent substance including a first fluorescent substance and a second fluorescent substance that are different from each other together with a resin.

7. A back light unit including the color conversion film of claim 1.

* * * * *